United States Patent
Blott et al.

(10) Patent No.: US 7,822,066 B1
(45) Date of Patent: Oct. 26, 2010

(54) PROCESSING VARIABLE SIZE FIELDS OF THE PACKETS OF A COMMUNICATION PROTOCOL

(75) Inventors: Michaela Blott, Malahide (IE); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 160 days.

(21) Appl. No.: 12/337,873

(22) Filed: Dec. 18, 2008

(51) Int. Cl.
*H04J 3/24* (2006.01)
(52) U.S. Cl. .................................... 370/474; 370/465
(58) Field of Classification Search .............. 370/465, 370/470–472, 474, 476
See application file for complete search history.

(56) References Cited

U.S. PATENT DOCUMENTS

| | | | |
|---|---|---|---|
| 6,952,677 B1 * | 10/2005 | Absar et al. ................ | 704/500 |
| 2003/0219015 A1 * | 11/2003 | Constant Six et al. ....... | 370/389 |
| 2005/0195820 A1 * | 9/2005 | Betts et al. ................. | 370/392 |
| 2009/0168803 A1 * | 7/2009 | Tzavidas et al. ............ | 370/471 |

OTHER PUBLICATIONS

Xilinx, Inc.; U.S. Appl. No. 12/186,428, filed Aug. 5, 2008 by Attig et al.

\* cited by examiner

*Primary Examiner*—Ricky Ngo
*Assistant Examiner*—Gary Mui
(74) *Attorney, Agent, or Firm*—LeRoy D. Maunu

(57) ABSTRACT

Approaches for processing packets having variable size fields. In one approach, an extraction circuit determines a size of a variable size field in the packets. A plurality of operation circuits access fields of the packets, and each operation circuit includes a control circuit that determines positions of fields in the packets. The position of an accessed field in a packet varies according to changes in size of the variable size field. A reconfiguration circuit is coupled to the extraction circuit and to the control circuit of each of the operation circuits. The reconfiguration circuit is responsive to a change in size of the variable size field from one packet to the next and reconfigures the control circuit of an operation circuit to correctly determine the field positions in the next packet.

20 Claims, 4 Drawing Sheets

PROCESSING VARIABLE SIZE FIELDS OF THE PACKETS OF A COMMUNICATION PROTOCOL

FIELD OF THE INVENTION

The present invention generally relates to processing the packets for a communication protocol, and more particularly to processing variable length fields of the packets for a communication protocol.

BACKGROUND

Many communication protocols use packets to convey data and control information over a communication link or through a communication network. A packet includes fields for the data and control information. To simplify the implementation of communication protocols, many communication protocols use a fixed format for the fields. However, fixed formats limit the capabilities and performance of an implementation of a communication protocol. For example, infrequently needed fields must be included in all packets.

A communication protocol can be implemented using a pipeline of stages, with each packet being partially processed in each stage of the pipeline. High performance operation is achievable by distributing the processing of the communication protocol across the stages. With a fixed format, the fields of the packets are readily identified. However, pipelines are difficult and time consuming to implement when the format is not fixed, because the position of the fields is variable.

A communication protocol can be implemented using a processor. With a fixed format, simple data structures can describe the packet formation. More complex data structures can describe a format that is not fixed; however, it is difficult and time consuming to create these complex data structures. In addition, the processor frequently becomes a bottleneck preventing high performance operation.

The present invention may address one or more of the above issues.

SUMMARY

The invention provides various approaches for processing packets having at least one variable size field. In one embodiment, a packet processing system includes an extraction circuit that determines sizes of the at least one variable size field for each of the packets. Each of a plurality of operation circuits in the system accesses at least one of the fields of each packet and includes a control circuit that determines a position in each packet for each field accessed by the operation circuit. The position of an accessed field in the packets varies according to changes in size of the at least one variable size field in the packets. A reconfiguration circuit is coupled to the extraction circuit and to the control circuit of each of the operation circuits. The reconfiguration circuit is responsive to a change in size of the at least one field from one packet to a next packet, and in response thereto reconfigures the control circuit of at least one of the operation circuits to determine the position in the next packet of each field accessed by the at least one operation circuit.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
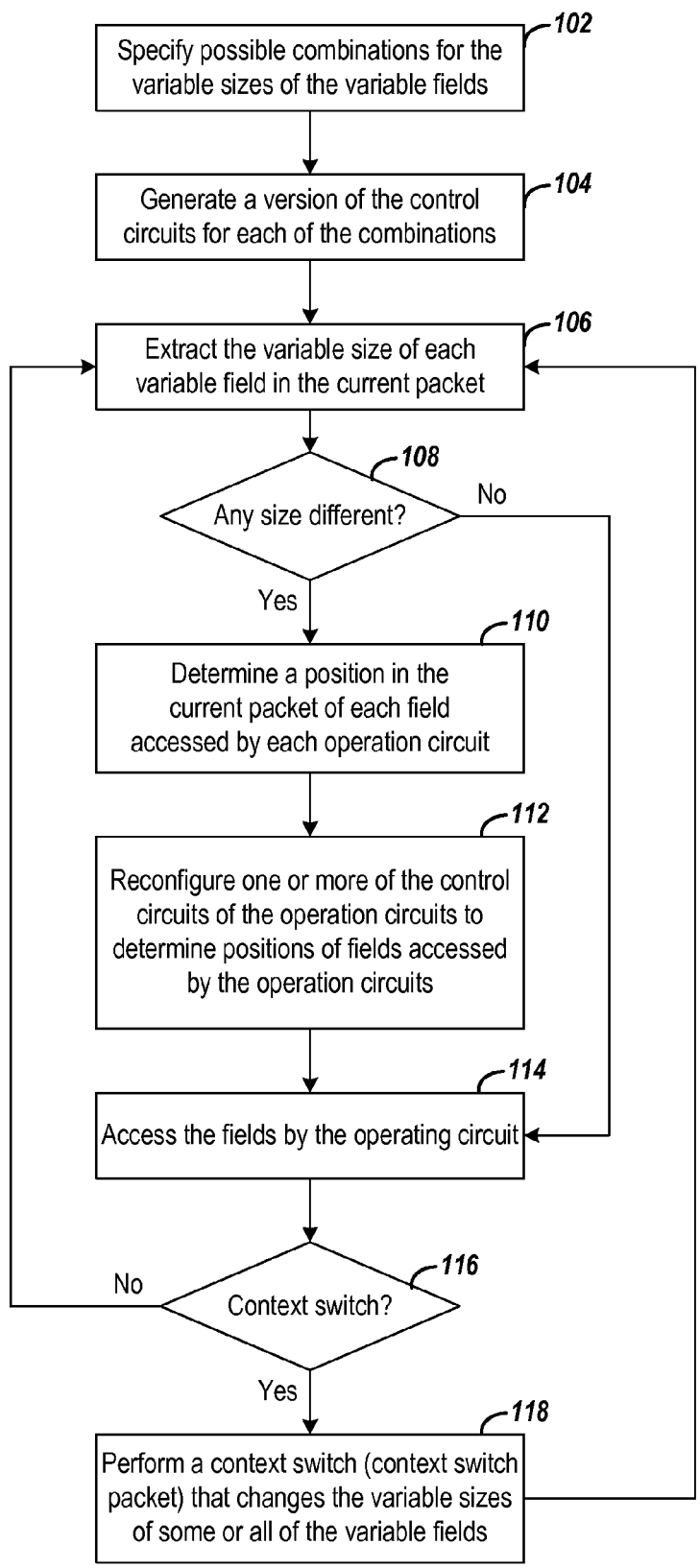
FIG. 1 is a flow diagram of a process for processing packets of a communication protocol in accordance with various embodiments of the invention.

FIG. 1 is a flow diagram of a process for processing a sequence of packets of a communication protocol in accordance with various embodiments of the invention. The packets each include a plurality of fields with at least one of the fields having a variable size. The fields of the packets are accessed by a plurality of operation circuits, with each of the operation circuits accessing at least one of the fields of each packet. In one embodiment, the operation circuits are respective stages of a pipeline, with the pipeline inputting, processing, and outputting the packets in sequential order. The operation circuits handle different types of operations such as inserts or modifications of packet fields. Each operation circuit includes a control circuit that determines a position in each packet of each field accessed by that operation circuit and that synchronizes the processing of the packets with the other operation circuits. Offsets are programmed into these control circuits to determine the locations of the relevant fields of a packet for a given processing circuit. These offsets are typically programmed at compile time.

Due to the variable size of at least one of the fields of the packets, however, the location of each field accessed by each operation circuit can change from one packet to the next. Example 1 shows a packet description in which the location of a trailer field, which follows the variable size payload field, may vary from packet to packet.

```
format frame1=(
header: 128,
length: 16,
payload: length*16,
trailer: 32);
```

Example 1

In the example it may be observed that the field called length in the packet is used to specify the size of the field called payload. Thus, the size of the payload may vary from packet to packet. But the size may be determined from the value of length. Also, the location of trailer can be determined based on the size of payload.

In Example 2, the position of the header3 field depends on condition1 that can only be evaluated at run-time.

```
format frame2=(
header1: 128,
[condition1] header2: 64,
header3: 128,
payload: *);
```

Example 2

In this example, the size or presence of header2 depends on condition 1, and the locations of header3 and payload depend on the size/presence of header2. The expression specified by condition1 may be based on fields from one or more previous packets.

In accordance with one embodiment of the invention, the control circuit of a given operation circuit can be reconfigured at run time (rather than compile time) when the location of the fields accessed by that operation circuit changes from one packet to the next. Specifically, the operation circuits are configured to access the desired fields of a packet that has at least one field of variable size. If the size of the field changes from the current packet to the next packet, then the locations of various fields accessed by the operation circuits may also change. In this scenario, the control circuit of each affected operation circuit is reconfigured to allow those operation circuits to access the fields at the new locations.

In FIG. 1, the process generally creates a version of the control circuit for each possible size of the fields prior to the processing of the packets by the operation circuits. In step 102, each possible combination for the variable sizes of the fields is specified. A control circuit is then generated in step 104 for each possible location of the fields that are accessed by the operation circuits. In an alternative embodiment, the control circuits can be generated as needed responsive to changes in the sizes of the fields between packets. At run time, the current size of each variable size field of a current packet is extracted in step 106. It is then determined in step 108 if there has been a change in field size relative to the previous packet. It will be appreciated that the size of a field could change to zero, leaving that field absent from the packet. Extracting the size(s) of a variable sized field(s) and determining a change in size is described further in the description of the extraction circuit of FIG. 2.

If the size of a field has changed in the current packet from the previous packet, then the control circuits of one or more of the operation circuits are reconfigured in steps 110 and 112. The location of each field of the current packet accessed by the operation circuits is determined based on the changed size in step 110. The control circuit of each operation circuit that accesses a field whose location has changed is reconfigured in step 112, for example by replacing the control circuit with one of the pre-generated control circuits. The current packet is then processed in step 114 with the operation circuits accessing the desired fields of the current packet. If the size of a field has not changed in the current packet relative to the previous packet as determined in step 108, then the process proceeds to step 114 where the current packet is processed by the operation circuits without reconfiguring control circuit(s).

In certain instances, the time required at run time to generate control circuits specific to a packet instance and/or the time required simply to reconfigure the operation circuits with pre-generated control circuits may take too long given throughput requirements. In such instances, the operation circuits would not typically be reconfigured on a per-packet basis. Thus, as an alternative to the dynamic determining of any field size changes with each successive packet and the reconfiguring for such changes, or in combination therewith, a programmed context switch may be used to reconfigure the necessary control circuits.

The context switch embodiment assumes that some number of packets having fields of the same sizes are input to the system, and that a context switch is effected by detecting a change in field size. For a context switch, the operation circuits are reconfigured upon recognition of context switches across sequences of packets. The control circuits of the operation circuits are changed to reflect programmed context switches. The reconfiguration time is then amortized over many packets. In this case, the packet formats are used as a particular trigger for such reconfiguration, with the reconfiguration circuit indentifying a context switch based on changes in the sizes of the fields. At step 116, the process determines whether a context switch is required. If a context switch is required, the process proceeds to step 118, where selected control circuits of the operation circuits are changed to accommodate the sizes of the fields according to the new context. In one embodiment, a buffer is used to store the incoming packets while the control circuits are reconfigured to accommodate the new context. The process then returns to step 106 and processing of the next packet occurs in the manner discussed above. If a context switch is not needed, then the process returns to step 106 where processing of the next packet occurs.

Figure 2:
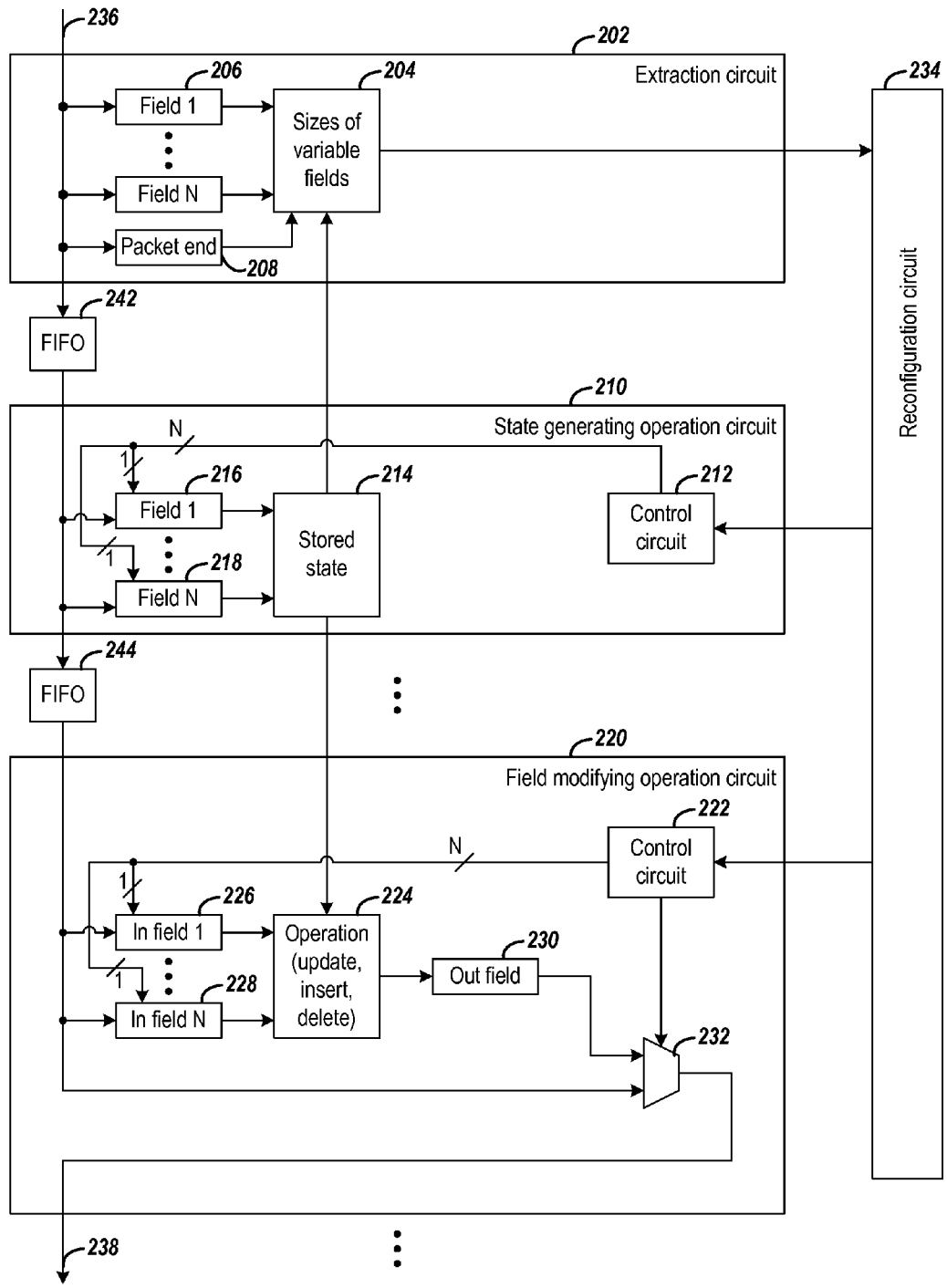
FIG. 2 is a block diagram of a system for processing packets of a communication protocol in accordance with various embodiments of the invention.

FIG. 2 is a block diagram of a system for processing packets of a communication protocol in accordance with various embodiments of the invention. The packets include a plurality of fields that include at least one field having a variable size. The system includes an extraction circuit 202 having an operation block 204 that determines the variable size of each field for each of the packets, such as field 1 stored in register 206. In one embodiment, the extraction circuit 202 determines the variable size of a field in the packet from a scaled magnitude of the variable size from another one of the fields of the packet. For example, as shown above in the frame1 format, the size of the payload is a scaled representation of length.

In another embodiment, the extraction circuit 202 determines the variable size of a field in the packet in response to a stored state 214 that is a function of at least one of the fields of one or more previous packets. For example, as shown above in the frame2 format, the size of header2 is dependent on condition1 that is based on a field of a previous packet.

The system further includes a plurality of operation circuits, for example, 210 and 220, each of which accesses at least one of the fields of the packets. The extraction circuit 202 and the operation circuits 210 and 220 are connected in a pipeline that processes the fields of a packet in sequential order. The stages of the pipeline (i.e., extraction circuit 202 and operation circuits 210 and 220) are connected to each other by respective FIFO buffers 242 and 244. The FIFO buffers 242 and 244 each have a width that is equal to the amount of data processed by each stage during a single cycle, for example, four bytes.

The operation circuits 210 and 212 each include a respective control circuit 212 and 222 that determines a position in each packet of each field accessed by its operation circuit. The control circuits 212 and 222 enable the operation circuits 210 and 220 to access the desired fields of a packet by identifying the locations of the desired fields within the packet. For example, the control circuits 212 and 222 provide control signals that load the required fields into registers 216 and 226 in response to those fields of a packet reaching the output location(s) in the FIFO buffer. Further detail regarding the manner in which the control circuits determine when the sequential processing of fields of a packet has reached the desired fields is discussed below in relation to FIG. 3.

In one embodiment, when fields accessed by extraction circuit 202 and operation circuits 210 and 220 have fixed sizes, then certain ones of the registers 206, 216, 226 that store the accessed fields can have fixed sizes equal to the sizes of these fields. The position in the packets of the fields accessed by the operation circuits 210 and 220 will vary in response to the varying size of the fields in different packets. In one embodiment the operation circuits are implemented in a field programmable gate array (FPGA), and the FPGA is reconfigured at run time with new control circuit(s) depending on particular changes in field sizes.

In one embodiment, an operation block 224 of operation circuit 220 generates an updated value for one of the fields of each packet as a function of at least one of the fields of the packet. In another embodiment, the operation block 224 of operation circuit 220 generates an updated value for one of the fields of a packet as a function of a stored state 214, with operation circuit 210 generating the stored state 214 as a function of at least one of the fields of another packet. The operation circuit 210 generates the stored state based on the values in registers 216 and 218 of certain specified fields of the other packet. Operation block 224 of operation circuit 220 performs either an insert action or a delete action on a field of each packet in yet another embodiment. One of the operation circuits is a memory access circuit that performs reads/writes of variable quantities of data from/to a memory for one of the fields of a packet accessed by the operation circuit according to another embodiment.

The system further includes a reconfiguration circuit 234 that reconfigures the control circuits 212 and 222 of each of the operation circuits 210 and 220 in response to changes in size of variable size fields in the packets. The reconfiguration circuit 234 is coupled to the extraction circuit 202 to indicate to the reconfiguration circuit the need to reconfigure certain control circuits, for example, 212 and 222. The reconfiguration circuit 234 is coupled to the control circuits 212 and 222 in a manner that supports reconfiguration of those control circuits. For example, in an FPGA implementation the coupling from the reconfiguration circuit to the control circuits may be by way of the configuration access port of the FPGA to configuration memory cells of the FPGA. In an alternative embodiment, the field locations may be parameterized by way of register values within each of the control circuits, with the reconfiguration circuit updating those registers when there is a change in field size.

In one embodiment, the extraction circuit 202 and the operation circuits 210 and 220 are respective stages of a pipeline, with the extraction circuit 202 being the first stage of the pipeline. The pipeline inputs a sequence of packets into the extraction circuit on line 236, and outputs a modified sequence of packets from the operation circuit 220 on line 238. The pipeline also inputs and outputs the fields of each packet in a sequential order of the fields in the packets. For each packet, the operation block 224 of operation circuit 210 generates an output value in register 230 for updating a specified field of the packet. The operation block 224 generates the output value from stored state 214 and the values in registers 226 and 228 of certain fields of the packet. Multiplexer 232 outputs the fields of a packet as they appear on input line 236 until reaching the field corresponding to the output value in register 230. Upon reaching the field corresponding to the output value in register 230, control circuit 222 directs multiplexer 232 to output on line 238 the value from register 230. The pipeline can include further operation circuits in addition to the operation circuits 210 and 222 shown in FIG. 2.

Figure 3:
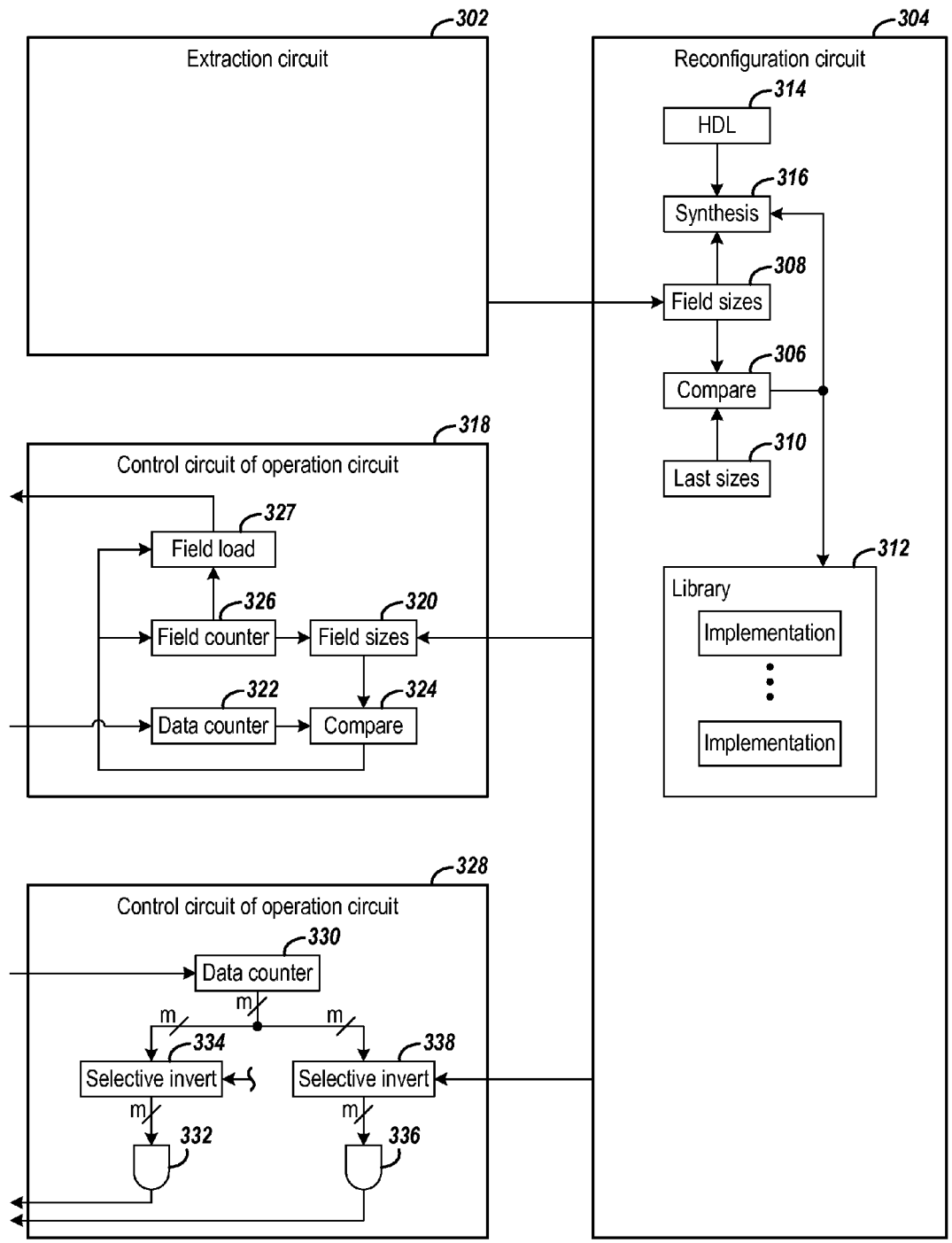
FIG. 3 is a block diagram illustrating reconfiguration of a system for processing packets in accordance with various embodiments of the invention.

FIG. 3 is a block diagram illustrating reconfiguration of a system for processing packets in accordance with various embodiments of the invention. The system includes an extraction circuit 302 that determines the variable size of each field for each of the packets, e.g., in the same manner as the extraction circuit 202 of FIG. 2. Thus, for illustration purposes, further details of the extraction circuit 302 are omitted from FIG. 3. For a given packet, the field sizes determined by the extraction circuit 302 are provided to reconfiguration circuit 304. The reconfiguration circuit 304 includes comparison block 306 that compares the field sizes of the current packet, which are stored in register 308, to the field sizes of the last packet, which are stored in register 310. If the field sizes of the current packet are the same as the field sizes of the last packet, then no reconfiguration of the control circuits of the operation circuits is performed. If the field sizes of the current packet are different from the field sizes of the previous packet, then the reconfiguration circuit 304 reconfigures the control circuits, such as 318 and 328, of at least one of the operation circuits prior to the processing of the current packet by those operation circuits.

In one embodiment, the reconfiguration circuit 304 includes a library 312 that contains pre-generated implementations of the control circuits for various sizes of the fields. In this instance, the reconfiguration circuit 304 selects a corresponding one of the pre-generated implementations of the control circuit for each of the operation circuits for the current field sizes of the current packet and implements the selected control circuits in the operation circuits. In another embodiment, the reconfiguration circuit 304 includes a synthesis block 316 that synthesizes the required control circuits from a hardware description language (HDL) specification that is stored in memory 314 in response to a change in field size.

In one embodiment, the extraction circuit 302 determines the size of each field in the current packet and the reconfiguration circuit 304 sets registers 320 of control circuit 318 with sizes of the fields. Registers 320 are an array of field sizes indexed by the field counter 326. Registers 320 can also include the sizes for fixed-sized fields. The sizes may be individual field sizes or respective offsets from the beginning of the packet.

The control circuit 318 uses a data counter 322 and the field sizes to determine which field of the current packet is present at the input to the operation circuit, the fields of a packet being passed in sequential order through the pipeline stages of the operation circuits. Data counter 322 begins counting data units, such as bytes of eight bits, of the current packet in response to a control character that indicates the start of a packet. The field counter 326 initially references the first of the field size registers 320. As packet data is input to the operation circuit (e.g., shifted through the FIFO buffer 242 or 244 in FIG. 2), the data counter 322 is incremented.

The data count is provided to the compare circuit 324 along with the one of field sizes 320 referenced by the field counter 326. In response to the compare circuit 324 determining that the count in data counter 320 matches the provided field size, the field counter 326 is incremented to reference the next field in the field size registers 320. In addition, in response to the field counter 326 referencing a field that is accessed by the operation circuit, the control circuit 318 generates a corresponding control signal. For example, in one embodiment the field load circuit 327 generates a control signal for loading data from the FIFO buffer into a register of its operation circuits, such as register 216 or register 226 in FIG. 2. In such an embodiment, the field load circuit 327 determines the proper one of registers 216-218 into which the field data is to be loaded based on the compare circuit 324 indicating a match of the referenced one of field sizes 320 corresponding to the data counter 322, the particular field referenced by field counter 326, and operation circuit-specific control that specifies which field(s) is required. In another example embodiment, in response to the field counter 326 referencing a field requiring updating, the field load circuit 327 generates a corresponding control signal, such as the signal for controlling multiplexer 232 in FIG. 2.

It will be appreciated that each register in registers 320 might track the size of multiple fields. For example, a particular operating circuit may skip the first four fields of each packet, and the first one of registers 320 may store the total size of those first four fields.

In another embodiment, the control circuit 328 of an operation circuit determines the position in each packet of each field accessed by the operation circuit by a respective decode logic circuit coupled to the state vector. In one example, the state vector includes a data counter 330 that counts the data units of a packet, such as bytes of eight bits, as the data of each packet is pipelined into the circuit. There is a respective decode logic circuit for each field accessed by the operation circuit. In the example control circuit 328, there are two decode logic circuits. One decode logic circuit includes AND gate 332 and selective invert logic 334, and the second decode logic circuit includes AND gate 336 and selective invert logic 338. Each decode logic circuit determines when the data counter 330 has a value indicating that the accessed field is ready, for example, in FIFO buffer 244 (FIG. 2), and in response generates a signal whose state indicates that the data for the field is present. For example, the output signal from AND gate 332 may enable loading of one of registers 226-228 (FIG. 2).

Each selective invert logic is configured to invert selected bits of the value output by data counter 330 in order to activate the signal output from the AND gate. For example, if the data counter is a four bit counter (m=4) that counts from $0-15_{10}$ ($0000_2-1111_2$), and the accessed field begins at data unit $6_{10}$ ($0101_2$), then bits 0 and 2 of the output from counter 330 are inverted and bits 1 and 3 are not inverted (bits are numbered 0-3 from least significant to most significant bits of the value). When the data counter 330 output reaches $6_{10}$ ($0101_2$), the output of the selective invert logic will be $1111_2$ since bits 0 and 2 are inverted, and the output of the AND gate (332 or 336) will be activated.

When there is a change in field size that requires changing control circuit 328, the reconfiguration circuit 304 reconfigures the selective invert logic 334 and 338 accordingly. That is, the selective invert logic is reconfigured to invert 0 or more selected bit(s) of the counter value according to the desired value from the data counter.

The reconfiguration circuit 304 can include a reconfiguration port of a programmable integrated circuit, such as field programmable gate array (FPGA), that includes an array of programmable logic and interconnect resources, with the operation circuits being implemented in the programmable logic and the interconnect resources, and with the reconfiguration circuit 304 reconfiguring the control circuit of at least one of the operation circuits via the reconfiguration port.

Figure 4:
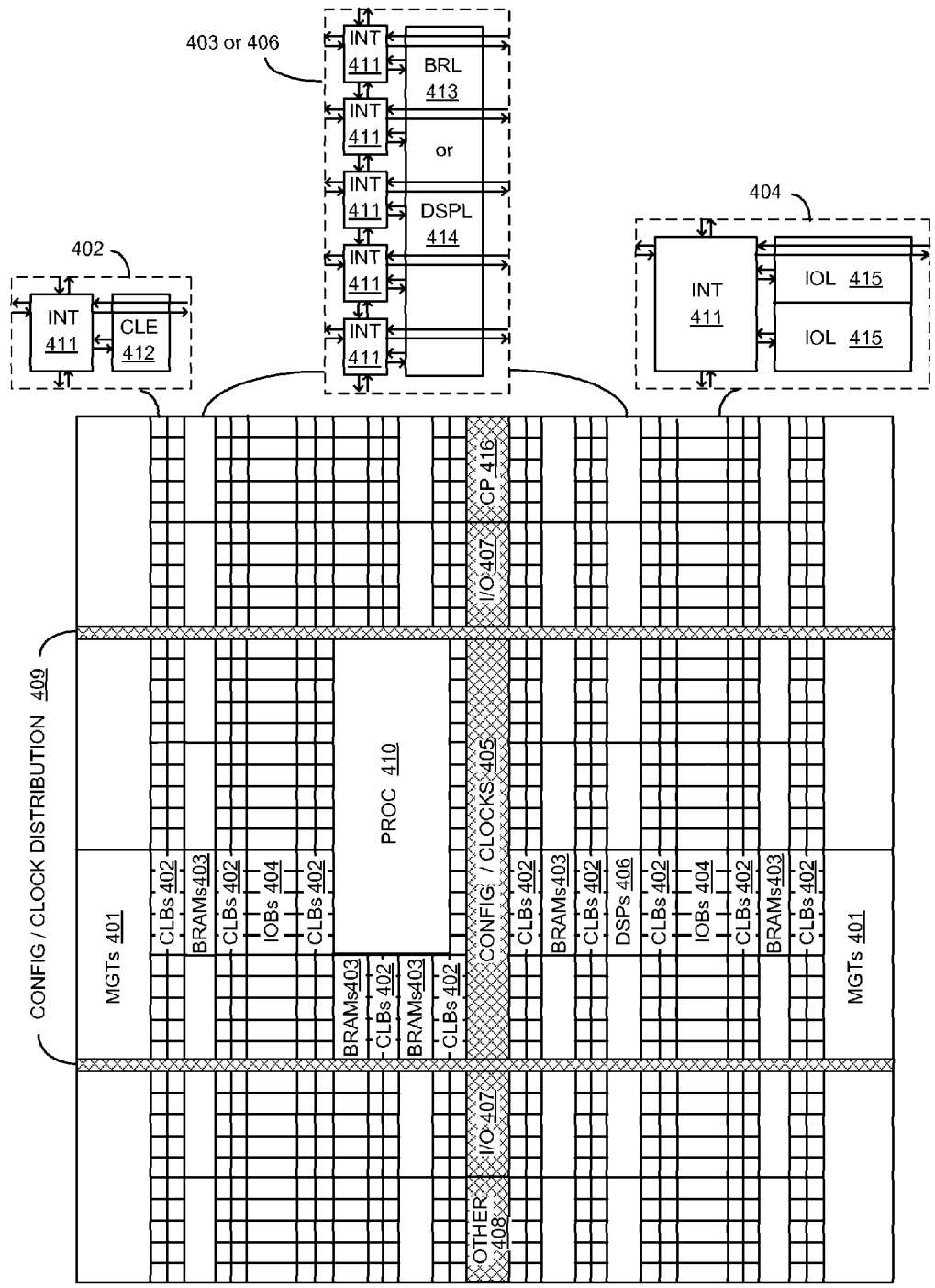
FIG. 4 is a block diagram of a programmable integrated circuit that is reconfigurable in accordance with various embodiments of the invention.

FIG. 4 is a diagram of an example field programmable gate array (FPGA) that is reconfigurable in accordance with various embodiments of the present invention. The FPGA of FIG. 4 includes several different types of programmable logic blocks. Those skilled in the art will appreciate that the FPGA of FIG. 4 provides only one example of an integrated circuit device on which the methods of the present invention can be practiced.

Advanced FPGAs can include several different types of programmable logic blocks in the array. For example, FIG. 4 illustrates an FPGA architecture 400 that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407) (e.g., clock ports), configuration and reconfiguration port (CP 416), and other programmable logic 408 such as digital clock managers, analog-to-digital converters, system monitoring logic, and so forth. Some FPGAs also include dedicated processor blocks (PROC 410).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element (INT 411) also includes the connections to and from the programmable logic element within the same tile, as shown by the examples included at the top of FIG. 4.

For example, a CLB 402 can include a configurable logic element (CLE 412) that can be programmed to implement user logic plus a single programmable interconnect element (INT 411). A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element (INT 411). As will be clear to those of skill in the art, the actual I/O pads connected, for example, to the I/O logic element 415 typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems and methods for processing packets having fields of variable sizes. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for processing packets of a communication protocol, the packets including a plurality of fields that include at least one variable size field, the circuit comprising:
   an extraction circuit that determines sizes of the at least one variable size field for each of the packets;
   a plurality of operation circuits, each operation circuit accessing at least one of the fields of each packet, each operation circuit including a control circuit that determines a position in each packet for each field accessed by the operation circuit, wherein the position of an accessed field in the packets varies according to changes in size of the at least one variable size field in the packets; and
   a reconfiguration circuit coupled to the extraction circuit and to the control circuit of each of the operation circuits, wherein responsive to a change in size of the at least one field from one packet to a next packet, the reconfiguration circuit reconfigures the control circuit of at least one of the operation circuits to determine the position in the next packet of each field accessed by the at least one operation circuit.

2. The system of claim 1, wherein, for each of the packets, the extraction circuit determines the variable size of a field in the packet from a scaled magnitude of the variable size from another one of the fields of the packet.

3. The system of claim 1, wherein, for each of the packets, the extraction circuit determines the variable size of a field in the packet in response to a stored state that is a function of at least one of the fields of another one of the packets.

4. The system of claim 1, wherein, for each of the packets, the extraction circuit determines the variable size of a field in the packet in response to an indication of an end of the packet.

5. The system of claim 1, wherein one of the operation circuits generates an updated value for one of the fields of each packet as a function of at least one of the fields of the packet.

6. The system of claim 1, wherein one of the operation circuits generates an updated value for one of the fields of each packet as a function of a stored state, and another one of the operation circuits generates the stored state as a function of at least one of the fields of each packet.

7. The system of claim 1, wherein one of the operation circuits performs an action on each packet, and the action is one of an inserting a field in the packet and deleting a field from the packet.

8. The system of claim 1, wherein the extraction and operation circuits are respective stages of a pipeline, the extraction circuit being a first stage of the pipeline, and the input of the packets, the input of fields within a packet, the output of packets, and the output of fields within a packet being pipelined.

9. The system of claim 1, wherein the reconfiguration circuit is coupled to configuration port of a programmable integrated circuit that includes an array of programmable logic and interconnect resources, the operation circuits are implemented in the programmable logic and interconnect resources, and the reconfiguration circuit reconfigures the control circuit of at least one of the operation circuits via the reconfiguration port.

10. The system of claim 9, wherein, in response to the variable size of a field being different between a first and a succeeding second one of the packets, the reconfiguration circuit selects one of a plurality of implementations of the control circuit and reconfigures the programmable logic and interconnect resources with the implementation, the implementation of the control circuit determining the position in the succeeding second packet of each field accessed by the operation circuit.

11. The system of claim 1, wherein the control circuit of at least one operation circuit comprises:
   a data counter that counts units of data in each packet;
   at least one decode logic circuit coupled to the data counter, wherein the decode logic circuit inverts selected bits of output from the data counter, passes unchanged bits other than the inverted bits, and outputs a signal as a product of the inverted bits and the unchanged bits.

12. A method for processing a sequence of packets of a communication protocol, the packets including a plurality of fields that include at least one field having a variable size, the method comprising:
   determining respective sizes of the variable size field in each of a first packet and a second packet that succeeds the first packet in the sequence;
   comparing the respective sizes of the variable size field;
   reconfiguring a control circuit in response to the respective sizes being unequal;
   determining by the control circuit a respective, packet-relative position of one or more fields in the second packet based on the respective size of the variable size field in the second packet; and
   accessing the one or more fields of the second packet in response to the respective, packet-relative position determined by the control circuit.

13. The method of claim 12, wherein the determining respective sizes includes determining the respective sizes from a scaled magnitude of the variable size from another one of the fields of the packet.

14. The method of claim 12, wherein:
   determining a respective size of the variable size field of the first packet includes determining the respective size from a first stored state that is a function of at least one of the fields of a packet that precedes the first packet; and
   determining a respective size of the variable size field of the second packet includes determining the respective size from a second stored state that is a function of at least one of the fields of a packet that precedes the second packet.

15. The method of claim 12, wherein the determining respective sizes includes determining the respective sizes from respective indications of end of packet for the first and second packets.

16. The method of claim 12, wherein the accessing includes updating a value of at least one of the one or more fields of the second packet as a function of a value in at least one of the fields of the second packet.

17. The method of claim 12, wherein the determining respective sizes of the variable size field is performed in a first stage of a pipeline, and the determining by the control circuit of the respective, packet-relative position and the accessing are performed in a second stage of the pipeline.

18. The method of claim 17, further comprising:
   storing a respective version of the control circuit for each of a plurality of possible sizes of the variable size field prior to the processing of the sequence of packets; and wherein the reconfiguring includes selecting one of the respective versions of the control circuit.

19. The method of claim 12, wherein the reconfiguring includes reconfiguring programmable logic and programming interconnect resources of a programmable integrated circuit.

20. A system for processing a sequence of packets of a communication protocol, the packets including a plurality of fields that include at least one field having a variable size, the method comprising:

means for determining respective sizes of the variable size field in each of a first packet and a second packet that succeeds the first packet in the sequence;

means for comparing the respective sizes of the variable size field;

means for reconfiguring a control circuit in response to the respective sizes being unequal;

means for determining by the control circuit a respective, packet-relative position of the one or more fields in the second packet based on the respective size of the variable size field in the second packet; and means for accessing the one or more fields of the second packet in response to the respective, packet-relative position determined by the control circuit.

* * * * *